United States Patent
Yankowitz

(10) Patent No.: US 10,644,542 B2
(45) Date of Patent: May 5, 2020

(54) WIRELESS CHARGING PLATFORMS VIA THREE-DIMENSIONAL PHASED COIL ARRAYS

(71) Applicant: Yank Technologies, Inc., Brooklyn, NY (US)

(72) Inventor: Joshua Aaron Yankowitz, New City, NY (US)

(73) Assignee: Yank Technologies, Inc., Brooklyn, NY (US)

( * ) Notice: Subject to any disclaimer, the term of this patent is extended or adjusted under 35 U.S.C. 154(b) by 0 days.

(21) Appl. No.: 15/759,473

(22) PCT Filed: Sep. 12, 2016

(86) PCT No.: PCT/US2016/051375
§ 371 (c)(1),
(2) Date: Mar. 12, 2018

(87) PCT Pub. No.: WO2017/044973
PCT Pub. Date: Mar. 16, 2017

(65) Prior Publication Data
US 2018/0262050 A1    Sep. 13, 2018

Related U.S. Application Data

(60) Provisional application No. 62/217,669, filed on Sep. 11, 2015.

(51) Int. Cl.
*H02J 50/12* (2016.01)
*H02J 7/02* (2016.01)
(Continued)

(52) U.S. Cl.
CPC .............. *H02J 50/12* (2016.02); *H01F 38/14* (2013.01); *H02J 7/025* (2013.01); *H02J 50/40* (2016.02);
(Continued)

(58) Field of Classification Search
None
See application file for complete search history.

(56) References Cited

U.S. PATENT DOCUMENTS

2004/0232845 A1    11/2004    Baarman et al.
2007/0073353 A1*    3/2007    Rooney ................ A61N 1/0531
607/36
(Continued)

FOREIGN PATENT DOCUMENTS

| CN | 102172322 A | 9/2011 |
| EP | 2276145 A1 | 1/2011 |
| EP | 2352219 A1 | 8/2011 |

OTHER PUBLICATIONS

International Search Report and Written Opinion in PCT/US2016/051375, dated Dec. 8, 2016.
(Continued)

*Primary Examiner* — Daniel Kessie
(74) *Attorney, Agent, or Firm* — Perkins Coie LLP

(57) ABSTRACT

Methods, systems, and devices are disclosed for wirelessly charging electronic devices. In one aspect, a wireless charging transmitter device includes a three-dimensional coil array electrically coupled to a power source and Power Source structured to include two or more coils to produce an electromagnetic field that emanates from the three-dimensional coil array, in which the coils are arranged such that at least two coils are perpendicular to each other to direct the electromagnetic field. The wireless charging transmitter device is operable to wirelessly charge an electronic device by providing the electromagnetic field at a receiver coil of the electronic device to convert the electromagnetic energy to electrical energy to power the electronic device.

14 Claims, 11 Drawing Sheets

(51) Int. Cl.
  *H02J 50/40* (2016.01)
  *H01F 38/14* (2006.01)
  *H02J 50/60* (2016.01)
  *H02J 50/70* (2016.01)
  *H02J 50/23* (2016.01)

(52) U.S. Cl.
  CPC .............. *H02J 50/60* (2016.02); *H02J 50/70* (2016.02); *H02J 50/23* (2016.02)

(56) References Cited

U.S. PATENT DOCUMENTS

| | | | |
|---|---|---|---|
| 2008/0049372 A1 | 2/2008 | Loke | |
| 2013/0069587 A1 | 3/2013 | Kuk | |
| 2013/0300205 A1* | 11/2013 | Tzanidis | H04B 5/0037 |
| | | | 307/104 |
| 2014/0176282 A1 | 6/2014 | Jung et al. | |
| 2014/0184155 A1 | 7/2014 | Cha | |
| 2014/0340031 A1 | 11/2014 | Mi et al. | |
| 2015/0180266 A1 | 6/2015 | McFarthing | |
| 2016/0141882 A1* | 5/2016 | Ichikawa | H02J 7/025 |
| | | | 307/104 |
| 2018/0342896 A1* | 11/2018 | Zhang | H02J 50/23 |

OTHER PUBLICATIONS

International Preliminary Report on Patentability in PCT/US2016/051375, dated Mar. 13, 2018.

Supplementary European Search Report from related European Patent Application No. EP16845292 dated Mar. 21, 2019.

R. Carta, et al. "Wireless powering for a self-propelled and steerable endoscopic capsule for stomach inspection" Biosensors and Bioelectronics, (2009), vol. 25, No. 4, pp. 845-851.

Q. Fu, et al. "A Control System of the Wireless Microrobots in Pipe" 2014 IEEE International Conference on Mechatronics and Automation (2014), pp. 1995-2000.

Australian Examination Report No. 1 for Standard Patent Application for Application No. 2016321421 dated Nov. 14, 2019, 3 pages.

Lee, et al. "Surface Spiral Coil Design Methodologies for High Efficiency, High Power, Low Flux Density, Large Air-Gap Wireless Power Transfer Systems" XP032410572, Applied Power Electronics Conference and Exposition (APEC), 2013, 28th Annual IEEE, Mar. 17, 2013, pp. 1783-1790.

EP Office Action for EP Appl. No. 16 845 292.8, dated Mar. 5, 2020, 7 pages.

* cited by examiner

Example of "open" resonant inductive transmitter coil

312 — Example of "closed" resonant inductive transmitter coil

412 — Example of "closed" resonant inductive transmitter coil

WIRELESS CHARGING PLATFORMS VIA THREE-DIMENSIONAL PHASED COIL ARRAYS

CROSS-REFERENCE TO RELATED APPLICATION(S)

This patent document is a 371 of International Application No. PCT/US2016/051375, filed Sep. 12, 2016, which claims priority to and the benefit of Provisional Patent Application No. 62/217,669, filed on Sep. 11, 2015, which are incorporated herein by reference for all purposes as if fully set forth herein.

PRIORITY CLAIM AND RELATED PATENT APPLICATIONS

This patent document is timely filed to claim the priority to, and the benefits of, U.S. Provisional Patent Application No. 62/217,669 entitled "WIRELESS CHARGING PLATFORMS VIA THREE-DIMENSIONAL PHASE COIL ARRAYS" and filed on Sep. 11, 2015.

TECHNICAL FIELD

This patent document elates to systems, devices, and processes that use wireless charging technologies.

BACKGROUND

Wireless charging techniques use an electromagnetic field to transfer energy between two or more devices based on inductive coupling. One device is the charging station or platform to generate the electromagnetic field to transmit the power of the generated electromagnetic field. The other device or devices receive(s) the electromagnetic power through resonant inductive coupling and convert the received electromagnetic energy to electrical energy to operate the receiver device or charge its power supply.

SUMMARY

Techniques, systems, and devices are described for providing wireless power transmission for charging electronic devices, e.g., such as smartphones, and robotics, such as microbotics. In some aspects, the disclosed technology includes resonant inductive wireless power systems to wirelessly charge one or more receiver devices by a transmitter device that is able to overcome severe angular misalignment between the transmitter and receiver devices. The disclosed technology is able to simultaneously charge multiple receiver devices in a stationary position or while moving in three-dimensional space.

In one aspect, a wireless power system is provided to include a wireless charging transmitter device including a power source electrically coupled to a three-dimensional coil array structured to include two or more coils to produce an electromagnetic field that emanates from the three-dimensional coil array. The coils are arranged such that at least two coils are perpendicular to each other to direct the electromagnetic field to a charging area in which an electronic device can be wirelessly charged by including a receiver coil to receive the electromagnetic field from the three-dimensional coil array to charge or power the electronic device In another aspect, a method is provided for wirelessly charging a device and includes providing a charging transmitter device to include induction coils arranged in a three-dimensional phased coil array to collectively generate an electromagnetic field in a charging area, arranging at least two induction coils to be perpendicular to each other to generate two electromagnetic fields that are perpendicular to each other, operating an adjustable capacitor network circuit coupled to the three-dimensional phased coil array to dynamically adjust an impedance based on an orientation or position of the device to be wirelessly charged in the charging area to increase energy transfer from the three-dimensional phased coil array to the device to be wirelessly charged.

Those and other aspects and their implementations are described in greater detail in the drawings, the description and the claims.

DETAILED DESCRIPTION

Figure 1:
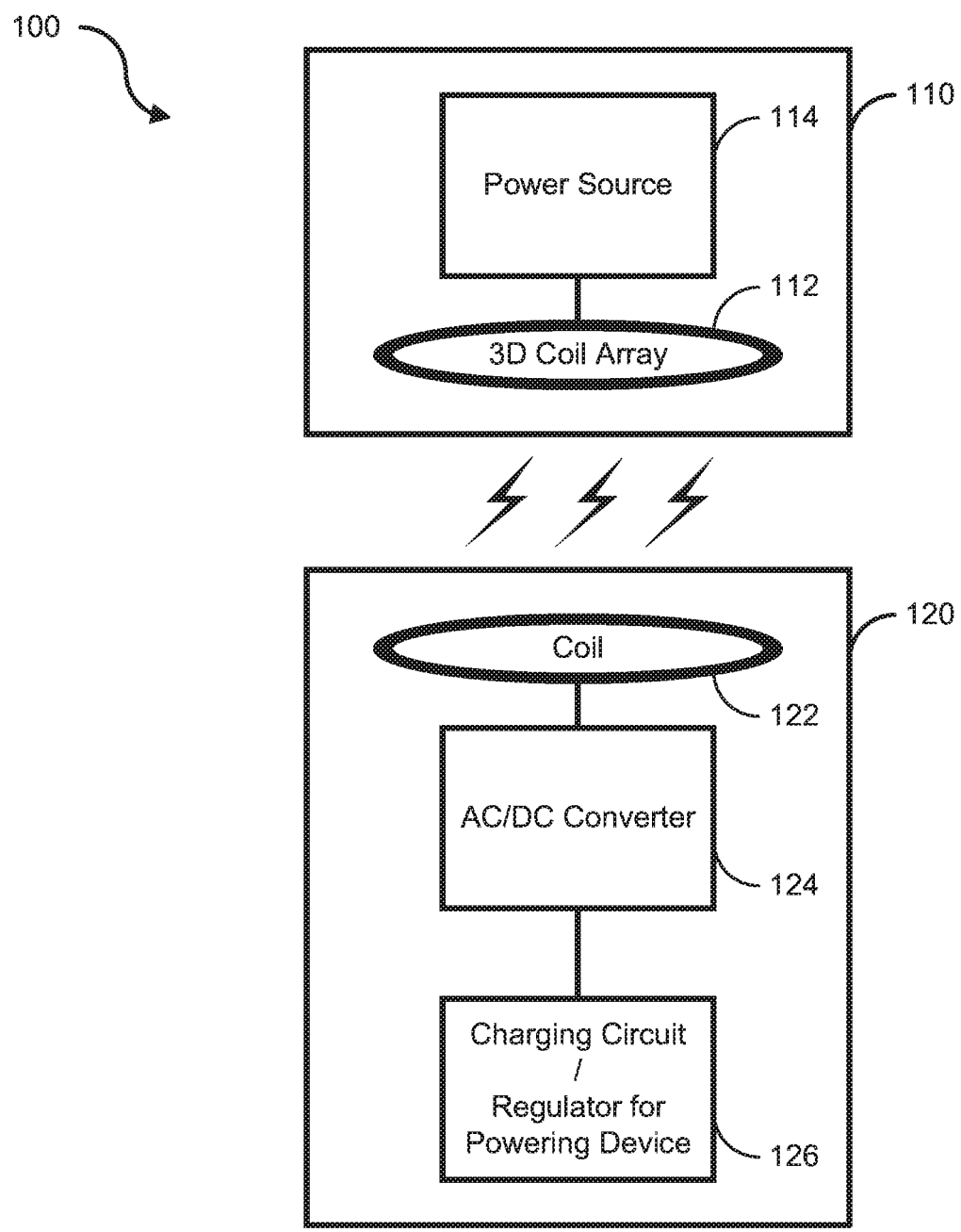
FIG. 1 shows a block diagram of an example resonant inductive wireless power system of the disclosed technology.

Wireless power transmission was demonstrated by using inductive coils by Nikola Tesla in 1593. Resonant inductive technology based on inductive coils has now been developed to achieve significant system efficiencies (e.g., above 80%) across mid-range distances or distances two, three, or even four times the coil diameters for high quality Q coils or coils with high inductive reactance relative to their resistance. Inductive coils can be designed to generate electromagnetic fields capable of traveling through objects including human tissues in various frequency ranges including the International, Scientific, and Medical (ISM) bands, such as 6.78 MHz and 13.56 MHz, with Specific Absorption Rates (SAR) and electric fields lower than FCC regulations at power levels in even the kilowatt (kW) range. Yet, various implementations of such resonant inductive technology for transmitting power tend to suffer from certain drawbacks, such as the difficulty charging multiple devices simultaneously and the undesired sensitivity to angular misalignment between the coils of the transmitting and receiver devices.

For example, in some wireless charging designs, if the angle between the receiver device (e.g., the electronic device to be wirelessly charged) and the transmitter device (e.g., wireless charging device) is misaligned, the receiver device may not be able to properly receive the power via the inductive coupling and thus cannot be properly charged, or in some cases, not charged at all. Furthermore, certain implementations of the resonant inductive technology have difficulty charging multiple devices simultaneously if the transmitter coil isn't much larger than the receiving coil(s).

Due to those and other technical issues in wireless charging, various commercial charging products based on the resonant inductive technology have been limited in certain aspects, such as various commercial inductive charging pad products. Some existing inductive charging pads are configured as thin matt-like objects that charge electronic devices when placed on the pad. These inductive charging pads are almost always completely reliant on an outlet with very limited charging distances, e.g., normally within the range of several centimeters. Moreover, inductive charging pads are usually off-resonant products because of the engineering challenges in constructing the impedance matching networks, which limits the charging distances for electronic devices from the pad to a maximum of approximately 5 cm due to the severe drop in system efficiency.

An engineering challenge exists in developing an impedance matching network that maximizes the power across the load, especially while the receiver(s) are in movement. One example of such challenges include minimization or elimination of charging disruptions or failure due to a change in the coupling coefficient between the transmitter and the receiver due to moving the angular position or distance of the receiver to the transmitter, e.g., such as the smartphone moving relative to the wireless charging product. Another example includes management of changes in the resistance of the load in the receiver, which can occur if a battery, e.g., such as the rechargeable lithium ion battery in a smartphone, is charged at a different capacity.

Many inductive charging pads are moveable within a range confined by the power cord and are not portable due to the limitation of the power cords. In this context, such charging pads can be moved relatively easily from one place to another, but maintain the same application of charging an electronic device when it is within touching or very close proximity to the product on a limited angular plane. This makes the applications of such inductive charging pads quite limited and inconvenient, and impractical for various charging needs.

Methods, systems, and devices are described for providing wireless power transmission for charging electronic devices, e.g., mobile or wearable communication devices (e.g., such as smartphones, tablets, smartglasses, smartwatches, etc.) and robotics (e.g., such as microbotics in compact sizes). In some aspects, the disclosed technology includes resonant inductive wireless power systems to wirelessly charge one or more receiver devices by a transmitter device that is able to overcome severe angular misalignment between the transmitter and receiver devices. The disclosed technology is able to simultaneously charge multiple receiver devices in a stationary position or while moving in three-dimensional space.

In some embodiments, for example, the resonant inductive wireless power systems based on the present technology include a transmitter device that includes amplifier circuits to draw power from a Direct Current (DC) power source, e.g., such as a rechargeable battery, and deliver the power to resonating LC tanks structured to include specialized coils. The LC tanks of the transmitter device converts the electrical signal into electromagnetic waves, which are transmitted to corresponding resonant LC tank(s) in one or more receiver devices. The receiver(s) may then convert the Alternating Current (AC) to DC, e.g., through a bridge rectifier, if DC is desired in the application, such as delivering the DC power to an electronic device (e.g., a smartphone).

Implementations of the disclosed technology may be used for open and closed wireless charging systems. For example, in an "open" inductive charging system, the receiver(s) can be stationary or move freely from the exterior of the transmitter within a defined radius from the transmitter while receiving power across the load(s). The charging radius varies according the construction and quality factors or Q factors of the individual coils, the resonant frequencies, the supply, and the impedance matching networks. In a "closed" charging system, for example, the receiver(s) can be stationary or move freely within the interior of the transmitter charging device while receiving power across the load(s). In some situations, the difference between an "open" and "closed" systems is in the construction of the transmitter coil array and receiver location.

Notably, "closed" systems can be designed to draw power directly from an Alternating Current (AC) power source, an example system being a wirelessly powered microbotic system. In this case, the system may or may not require power gain before being delivered to the resonating LC tanks in the transmitter.

Exemplary Embodiments of the Disclosed Technology

FIG. 1 shows a block diagram of an example resonant inductive wireless power system 100 of the disclosed technology. The system 100 includes a wireless charging (transmitter) device 110 and an electronic (receiver) device 120. The receiver device 120 includes one or more receiver coils 122 electrically coupled to a circuit 126 to supply received electrical power to the circuit 126. In some implementations, for example, the circuit 126 includes a charging circuit (e.g., to store electrical energy, such as a battery) or a regulator circuit and/or a buck converter to directly power the device 120 based on the converted electromagnetic energy converted to electrical energy at the coil 122. In some implementations, for example, the receiver device 120 includes an AC/DC converter to convert the AC electrical energy produced at the coil 122 to DC electrical energy to supply the charging circuit or regulator circuit 126.

The transmitter device 110 can include a power source 114 electrically coupled to a three-dimensional phased coil array 112 which include multiple inductive coils and are arranged to inductively transmit electromagnetic energy to a receiver coil 122 of a receiver device 120. The power source 114 can include an AC power source that can be connected to an electrical outlet by a power cable, or a DC power source within the device 110, e.g., such as a battery. In implementations including a DC power source, for example, the transmitter device 110 includes a DC/AC Converter to convert the DC electrical energy to AC electrical energy provided at the three-dimensional phased coil array 112.

The three-dimensional phased transmitter coil array 112 in the transmitter device 110 can be structured to include two or more inductive coils constructed in a three-dimensional format. Such coils can be rectangular, elliptical, circular, or surface spiral air or ferrite core coils. The three-dimensional phased transmitter coil array 112 can be constructed to form various geometric or shaped volumes, e.g., including rectangular or square volumes, spherical, elliptical or other curved volumes, spiral shaped volumes, or other shapes as desired. The three-dimensional phased transmitter coil array 112 can be structured to have the desired shape and volume to integrate into the shape of the overall transmitter device 110. For example, the structure of the three-dimensional phased transmitter coil array 112 allows the transmitter device 110 to compensate for a decrease in the electromagnetic induction of the receiver device or devices 120, e.g., due to a potential positioning shift by the transmitter and/or receiver(s) by sending electromagnetic fields from multiple angles on the x, y, and z-axis planes. During a wireless charging operation of the transmitter device 110, the three-dimensional phased transmitter coil array 112 can increase the angular flexibility of receiver device or devices 120 for a resonant inductive system. The three-dimensional phased transmitter coil array 112 is designed to allow the receiver device or devices 120 to maintain free 360-degree movement by having one or several of the transmitter coils in the transmitter coil array 112 strengthen the intensity and direction of the electromagnetic fields at each receiver device 120 to maintain efficient wireless power transfer as the angular alignment between the transmitter and the receiver coils becomes closer and closer to being perpendicular to each other, an undesired inductive coupling condition.

Wireless charging implementations according to the disclosed technology is comparable to beamforming, e.g., such as in radar. However, instead of controlling the transmission and reception directionality of radio signals, the disclosed wireless charging system technology controls the angle and strength of magnetic fields for a resonant inductive transmitter via the three-dimensional coils' phased angles and strength of the signal for each transmitter coil.

For example, in cases where a transmitter device uses a single rectangular, elliptical, circular, or surface spiral transmitter coil with an air or ferrite core, the direction of the magnetic field is either into or out of the coil depending on the flow of electrons. A receiving coil can be placed close enough to the transmitter coil so that the two coils begin to couple and the magnetic fields are induced upon the receiver. However, if the receiving coil approaches 90-degrees with respect to the positioning of the single transmitter coil, then the receiving coil does not couple well with the single transmitter coil because electromagnetic induction of the receiver is significantly reduced. Thus, there are "dead zones" or areas where the wireless power transfer process is greatly inhibited due to the angular positioning of the receiver relative to the transmitter, especially if the transmitter remains stationary while the receiver moves its angular positioning.

The three-dimensional phased transmitter coil array of the disclosed technology provides at least one of its coils to compensate for a potential angular alignment shift between the transmitter and the receiver, preventing potential "dead zones" due to transmitter and/or receiver positioning.

Figure 2A:
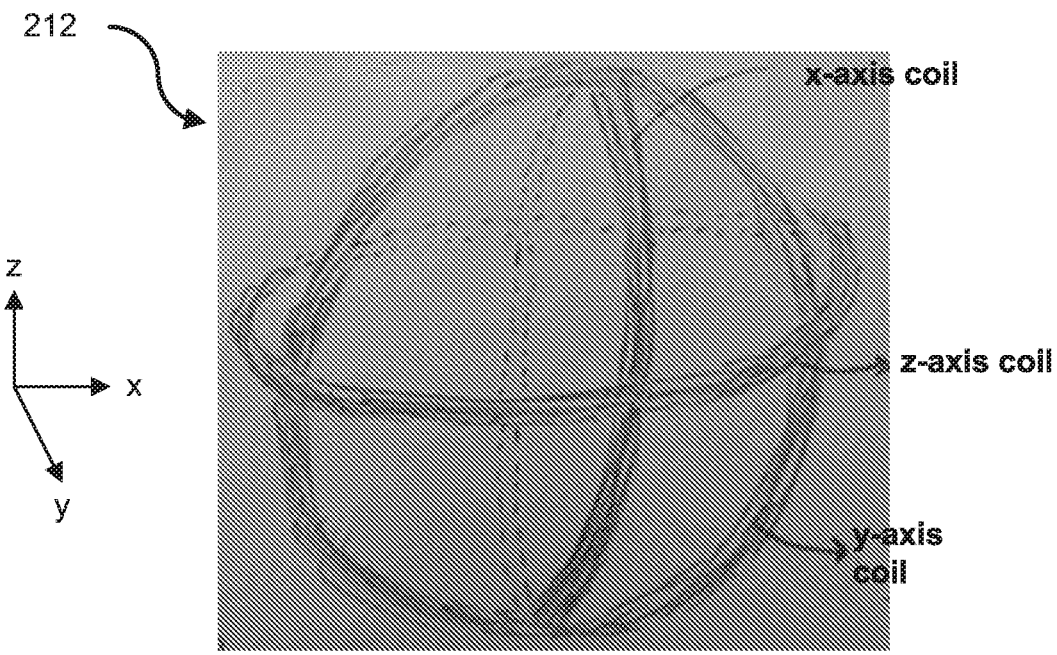
FIGS. 2A, 2B and 2C show examples of three-dimensional transmitter coil array of the present technology.
Figure 2B:
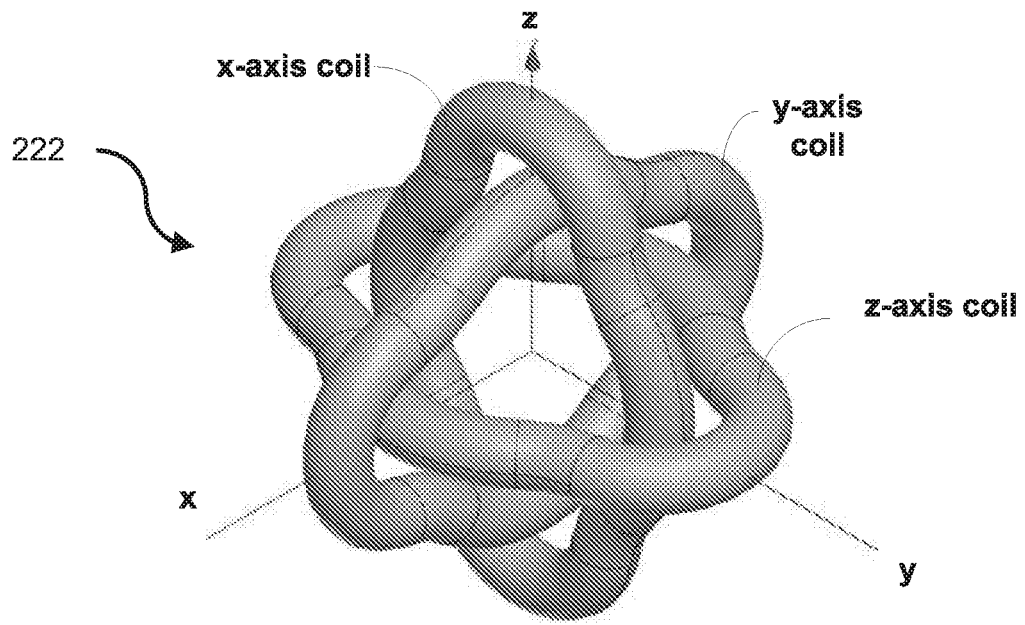

In embodiments of the system 100 for an "open" system implementation, for example, the three-dimensional coil array 112 is structured such that each successive coil is constructed inside the other. An example of this is shown in FIG. 2A where a three-dimensional transmitter coil array 212 includes three circular coils that are oriented at 90 degrees out-of-phase to one another on the x, y, and z-axis planes: the x-axis coil that is generally in a plane that is perpendicular to the x axis, the y-axis coil that is generally in a plane that is perpendicular to the y axis, and the z-axis coil that is generally in a plane that is perpendicular to the z axis. The three circular air-core coils of the transmitter coil array 212, as shown in FIG. 2A, are arranged perpendicular to one another on the x, y, and z axis planes. In some embodiments, for example, the number of coils in the array as well as their angular positioning to one another can alter in order to maximize the electromagnetic induction of the receiver as its angular position changes relative to the transmitter. Each coil in the example in FIG. 2A is generally in a circular or near circular loop (e.g., an elliptical loop). FIG. 2B shows another example of a three-dimensional transmitter coil array 222 includes three coils that are oriented at 90 degrees out-of-phase to one another on the x, y, and z-axis planes, where each coil is a non-circular or elliptical shape. In general, various coil geometries may used based on specific requirements of the charging applications.

A special kind of a three-dimensional phased coil array for an "open" system is called a surface spiral three-dimensional phased coil array. This kind of array is again 90 degrees out-of-phase to one another on the x, y, and z-axis planes, but also substantially diminishes the proximity effect at radio frequencies or the increase of effective resistance due to the angular windings of the turns.

If alternating currents are flowing through nearby conductors, such as wound wire, the distribution of current within the conductors can be constrained. This constrained effect is called the proximity effect, which causes an increase in effective resistance as the frequency typically increases, posing a great challenge for antenna design engineers in radio frequency bands.

Figure 2C:
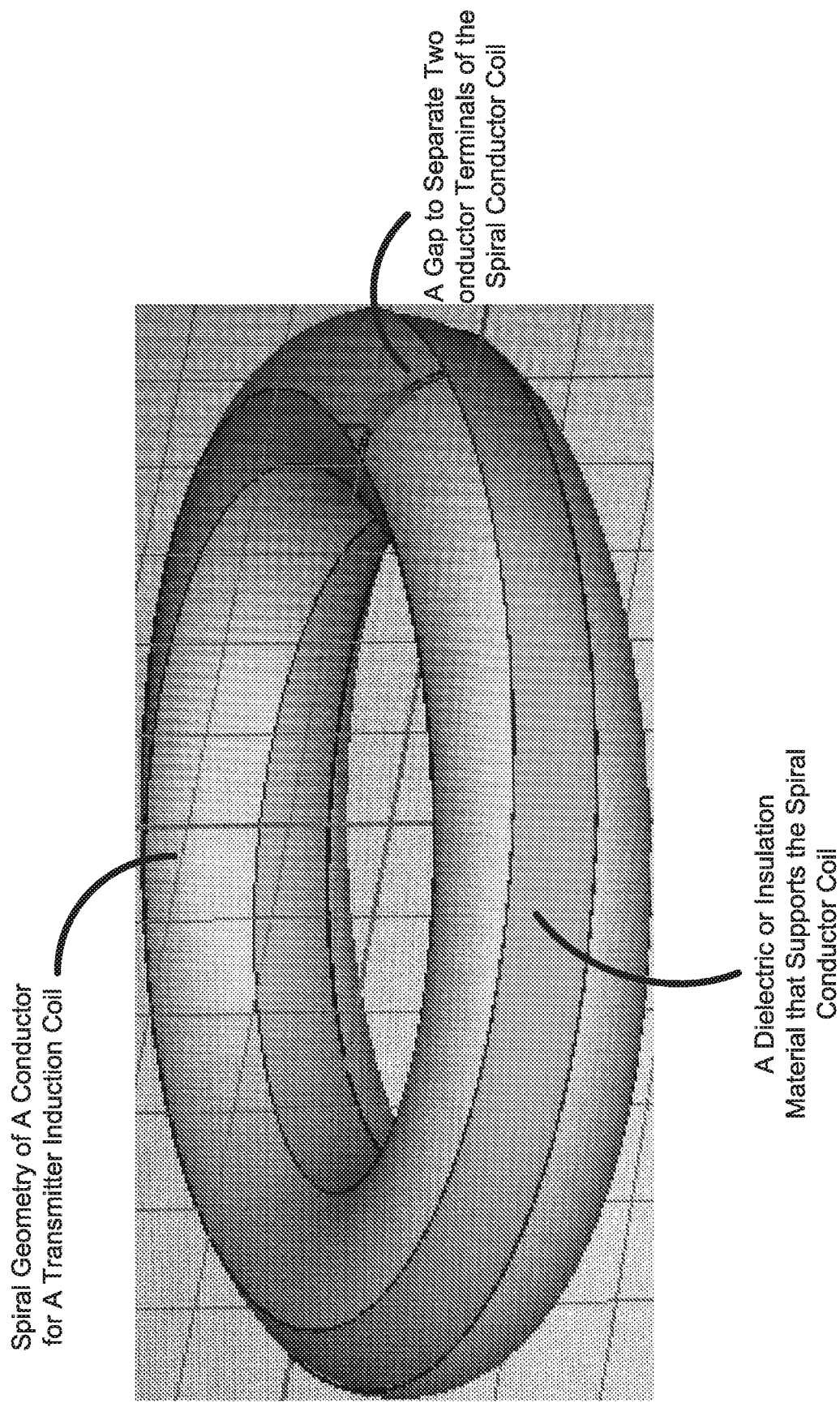

Each transmitter coil in a three-dimensional phased coil array may include an electrically conductor material such as a metal or other suitable conducting material in various suitable geometries. For example, a coil may include multiple loops to produce a desired electromagnetic field by a driving current in the coil. Also, the conductor for the coil may be in various geometries. FIG. 2C shows one example for a spiral geometry for the conductor coil in which the conductor material is a spiral with two ends of the spiral being separated by a gap as shown for coupling to a coil driver circuit such as the examples shown in FIGS. 6 and 7 that directs a current through the spiral. A support structure, which may be formed from a dielectric material or other insulating material, can be provided to support the spiral geometry of the conductor and may also be in a spiral geometry or some other suitable geometries. In some designs, such a support structure may not necessary when the conductor itself may maintain the desired spiral geometry. In such a surface spiral three-dimensional phased coil array, the turns for each antenna in the array may be wound at a desired angle to one another to allow more current to pass through each wound of the conductor, thereby diminishing the proximity effect. For example, in FIG. 2C, the turns are shown to be wound three times at an angular positioning to one another of ~120 degrees. With a thickness of only 40 um and a diameter of only ~6 inches, this example has a CST simulation Q of ~700 in the high frequency (HF) range, which given its size and RF band, makes it a highly efficient and ideal resonator for wireless charging applications. This use of the surface spiral technique to each coil in the antenna array can increase or maximize the energy strength of the magnetic fields of the coils in a three-dimensional phased coil array based on the disclosed technology. The above and other surface spiral designs can be applied to various coils in implementing the disclosed technology.

In embodiments of the system 100 for a "closed" system implementation, for example, the three-dimensional coil array 112 is constructed into the interior of the wireless charging product or transmitter device 110 to maximize the electromagnetic induction of the receiver device(s) 120 whether moving or stationary throughout the interior of the structure. The three-dimensional transmitter coil array 112 is configured such that the surface area of the transmitter device 110 is covered with transmitter coils of the array 112 or positioned in a three-dimensional manner that maximizes the electromagnetic induction of the receiver(s) for a desired portion of the transmitter. For example, the shapes, positioning, and number of coils in the structure may alter depending on what areas throughout the product need to compensate for the angular and positioning shift(s) of the receiver(s).

Figure 3:
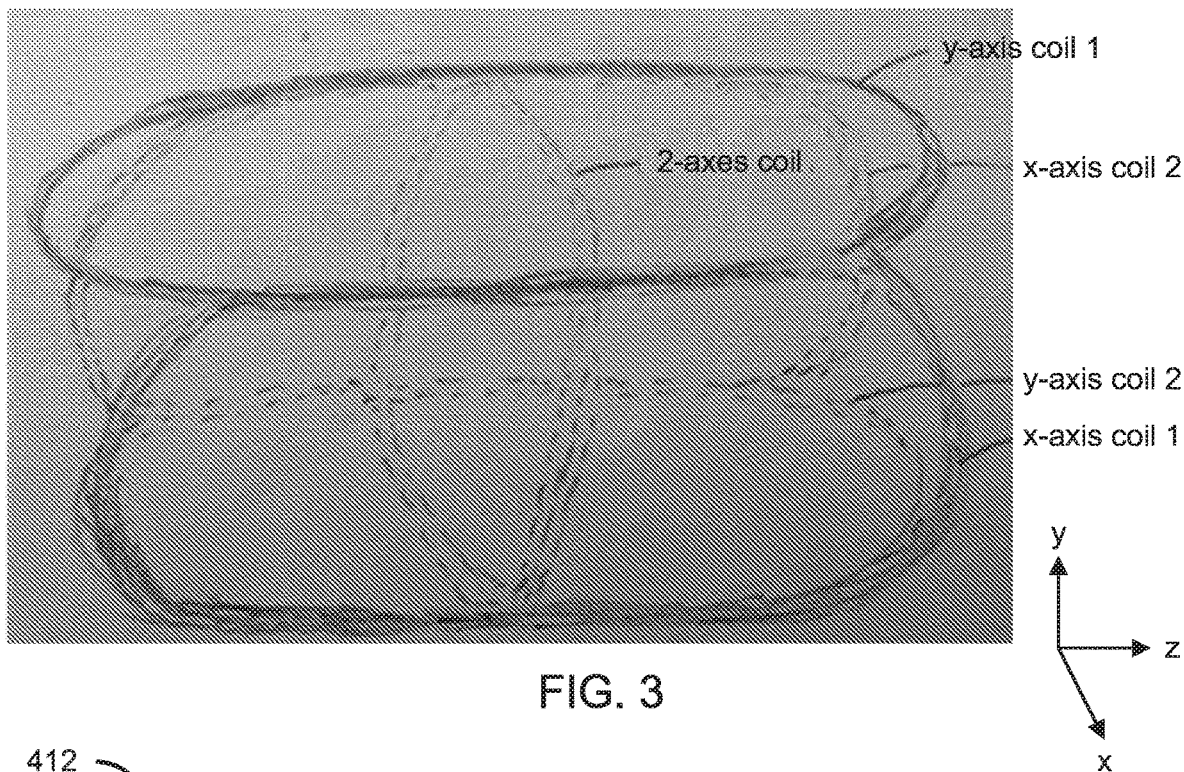
FIG. 3 shows a diagram of another example transmitter coil array of the present technology.

An example of a "closed" system configuration of the three-dimensional transmitter coil array 112 is shown in FIG. 3, which shows a diagram of a five-coil three-dimensional transmitter coil array 312 that includes five elliptical air-core coils positioned and arranged about each other on the x, y, and z axis planes. The coil array 312 is structured such that a first elliptical air core coil is arranged at a top region of the array about the y-axis plane (shown as y-axis coil 1 in FIG. 3), and a second elliptical air core coil is arranged at a bottom region of the array about the y-axis plane, parallel with the top region coil (shown as y-axis coil 2 in FIG. 3). A third elliptical air core coil is arranged at a first side region of the array about the x-axis plane (shown as x-axis coil 1 in FIG. 3), and a fourth elliptical air core coil is arranged at a second side region of the array about the x-axis plane, parallel with the first side region coil (shown as x-axis coil 2 in FIG. 3). A fifth elliptical air core coil is arranged such that it extends horizontally across the coil array 312, perpendicular to the first and second coils and to the third and fourth coils (shown as 2-axes coil in FIG. 3).

In an example application of this embodiment, the five elliptical transmitter coil array 312 can be configured in a transmitter device 110 to wirelessly supply power in the interior of a desired location or space for charging, such as an automobile, airplane, train or other vehicle so that the receiver device or devices 120, e.g., such as the driver's or passenger's smartphones, can freely move throughout the vehicle while efficiently charging the device, thereby leveraging the resonant inductive wireless charging system of the present technology. As a specific example for configuring this design for an auto vehicle, the five elliptical transmitter coil array 312 can be configured in the vehicle such that the first elliptical air core coil is arranged the roof of the vehicle that spans in diameter from the front to the back seats, the second elliptical air core coil is arranged in the floor of the vehicle extending approximately the same distance in diameter, the third elliptical air core coil is arranged such that it spans from the right-hand side of double doors and the fourth elliptical air core coil is arranged such that it spans approximately the same distance on the left-hand side, and the fifth elliptical air core coil is arranged such that it extends horizontally across the vehicle, perpendicular to the roof and floor coils (e.g., positioned between the front doors and back doors).

In another implementation of the system 100, a rectangular microbotic wireless charging system can be provided to include rectangular air core coils built into all six sides of the transmitter device 110, which would allow the microbots to be wirelessly charged throughout every section of the structure even as they move on a three-dimensional plane.

Figure 4:
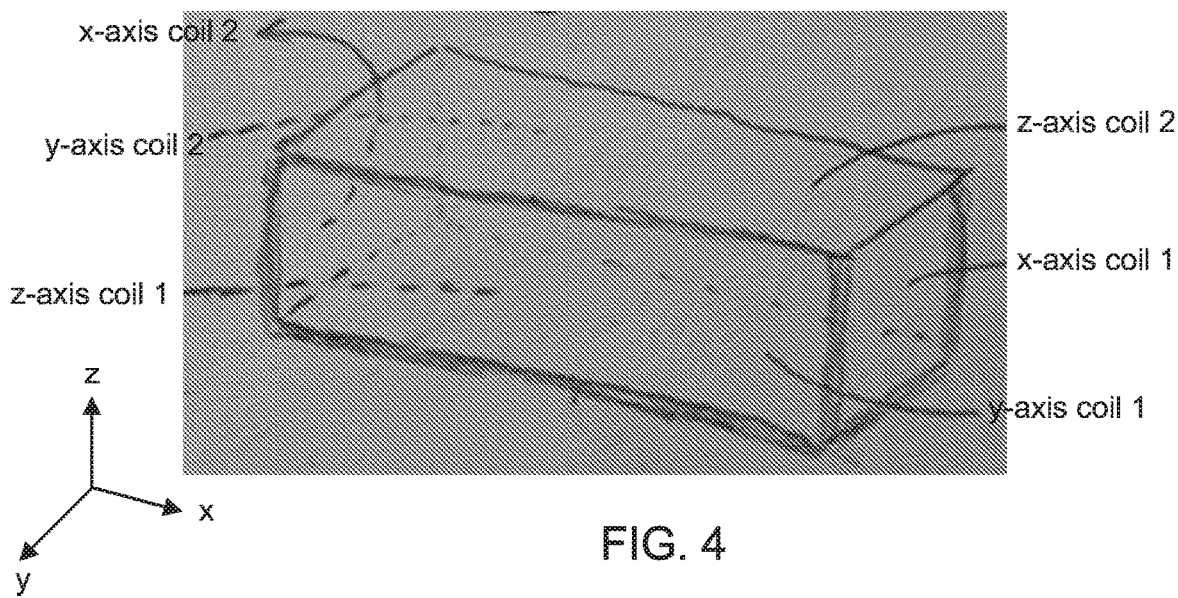
FIG. 4 shows a diagram of another example transmitter coil array of the present technology.

FIG. 4 shows another example of a "closed" system configuration of the three-dimensional transmitter coil array 112, which shows a diagram of a six-coil three-dimensional transmitter coil array 412 that includes six rectangular air-core coils positioned and arranged about each other on the x, y, and z axis planes. The coil array 412 is structured such that a first rectangular air core coil is arranged at a top region of the array about the z-axis (or x-y) plane (shown as z-axis coil 2 in FIG. 4), and a second rectangular air core coil is arranged at a bottom region of the array about the z-axis plane, parallel with the top region coil (shown as z-axis coil 1 in FIG. 4). A third rectangular air core coil is arranged at a first side region of the array about the y-axis (or x-z) plane (shown as y-axis coil 1 in FIG. 4), and a fourth rectangular air core coil is arranged at a second side region of the array about the y-axis plane, parallel with the first side region coil (shown as y-axis coil 2 in FIG. 4). A fifth rectangular air core coil at a third side region that is arranged horizontally at the intersections of the first, second, third, and fourth rectangular coils about the x-axis (or y-z) plane, and is perpendicular to the first, second, third, and fourth coils (shown as x-axis coil 1 in FIG. 4). A sixth rectangular air core coil at a fourth side region that is arranged horizontally at the intersections of the first, second, third, and fourth rectangular coils about the x-axis plane on the opposing side of the array 412 with respect to the third side (shown as x-axis coil 2 in FIG. 4).

In an example application of this embodiment, the six rectangular transmitter coil array 412 can be configured in a transmitter device 110 to wirelessly charge microbots. If microbots are able to leverage a resonant inductive charging platform while in motion, then the underlying functionality of such microbots could greatly expand. For instance, by not having to store significant power in a microbot through constant wireless charging, such a microbot could maintain very small size and simultaneously be able to build or compile themselves into reusable three-dimensional structures inside the transmitter in a manner similar to a three-dimensional printer, but with the ability to not only accurately simulate size, but also weight and multi-colored structures, which can be a more accurate and reusable form of prototyping. This example of a "closed" system embodiment of the present technology also maintains coils on the x, y, and z-axis planes, but with different placement and positioning due to the receiver devices (e.g., microbots) being located inside the transmitter device 110 during the wireless charging rather than on the outside of the system as in an "open" system.

Figure 5A:
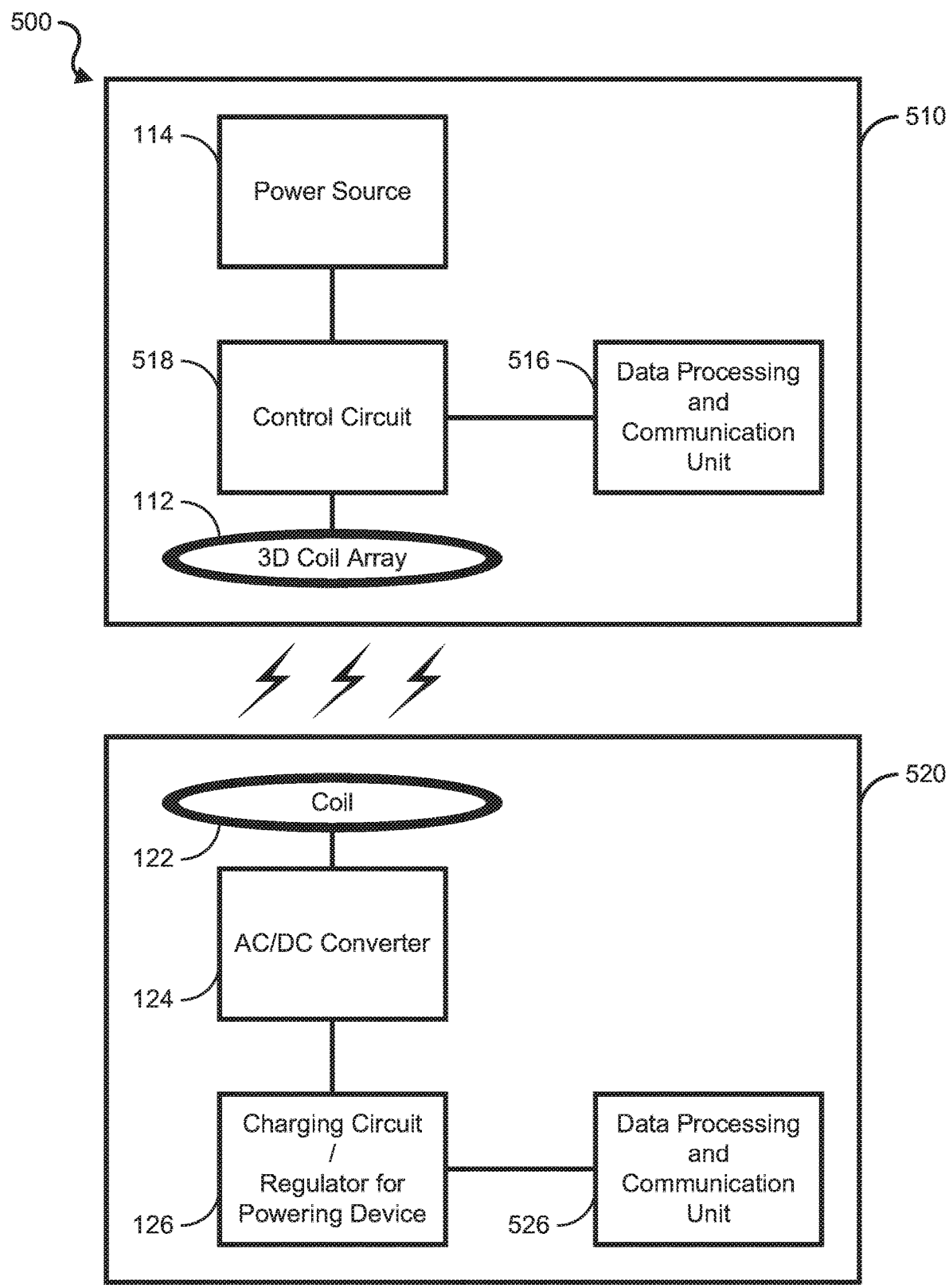
FIG. 5A shows a block diagram of another example resonant inductive wireless power system of the disclosed technology.

FIG. 5A shows a block diagram of another example resonant inductive wireless power system 500 of the disclosed technology. The system 500 includes a wireless charging (transmitter) device 510 and an electronic (receiver) device 520 that are configured like the transmitter device 110 and the receiver device 120, respectively, and additionally include a data processing and communication unit. The receiver device 520 includes a data processing and communication device 526 in communication with the circuit 126. The transmitter device 510 includes a data processing and communication unit 516 in communication with a control circuit 518 to control the electrical power supplied from the power supply 114 to the three-dimensional phased transmitter coil array 112. The control circuit 518 can also control the operational frequency and/or matching network of the transmitter device 510 as power is delivered to the three-dimensional phased transmitter coil array 112.

Figure 5B:
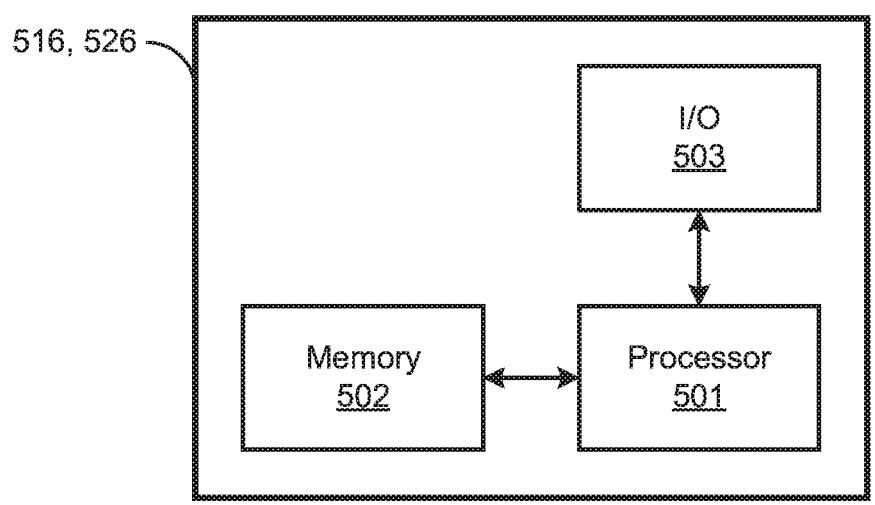
FIG. 5B shows a block diagram of an example data processing and communications unit.

An example embodiment of data processing and communications unit 516 and/or 526 is shown in FIG. 5B. The data processing and communications unit 516, 526 includes a processor 501 (e.g., such as a central processing unit (CPU) or microcontroller) to process data and a memory 502 in communication with the processor 501 to store and/or buffer data. The data processing and communications unit 516, 526 includes an input/output (110) unit 503 in communication with the processor 501 that provides wired and/or wireless interfaces (also referred to as communication interfaces) compatible with typical data communication standards for communication of the computer with other computers and computer systems, or external interfaces, sources of data storage, or display devices, among others. For example, the memory 502 can include processor-executable code, which when executed by the processor 501, configures the data processing and communications unit 516, 526 to perform various operations, such as receiving information, commands, and/or data, processing information and data, and transmitting or providing information/data to another entity or to a user. For example, the I/O unit 503 can include a transceiver to provide wired or wireless communications using one or more of the following standard communications interfaces, e.g., including, but not limited to, Universal Serial Bus (USB), IEEE 1394 (Firewire), Bluetooth, Bluetooth Low Energy (BLE), ZigBee, IEEE 802.11 (Wi-Fi), Wireless Local Area Network (Vs/LAN), Wireless Personal Area Network (WPAN), Wireless Wide Area Network (WWAN0, WiMAX, IEEE 802.16 (Worldwide Interoperability for Microwave Access (WiMAX)), 3G/4G/5G/LTE cellular communication methods, and parallel interfaces, among others.

In order to dynamically adjust to a change in the coupling coefficient of the receiver, a feedback system can be implemented to maintain consistent efficient wireless power transfer. In implementing the disclosed inductive charging technology, the coupling coefficient and impedance increase when the transmitter and receiver are brought closer together, increasing the reflected power to the transmitter and degrading the system efficiency. On the other hand, when the distance increases and the impedance approaches zero, a large current is then induced and can potentially damage transmitter circuits, such as transistors in Class D or Class E Amplifier configurations. In some implementations, the transmitter can be designed to combine a capacitance network with the three-dimensional phased coil array to dynamically alter the impedance in three-dimensional space without causing a resonant frequency shift, thereby maximizing the power delivered to the load and ensuring safe operation of the unit. This can be especially more effective when the individual coils in the array have independent feedback systems.

Figure 6:
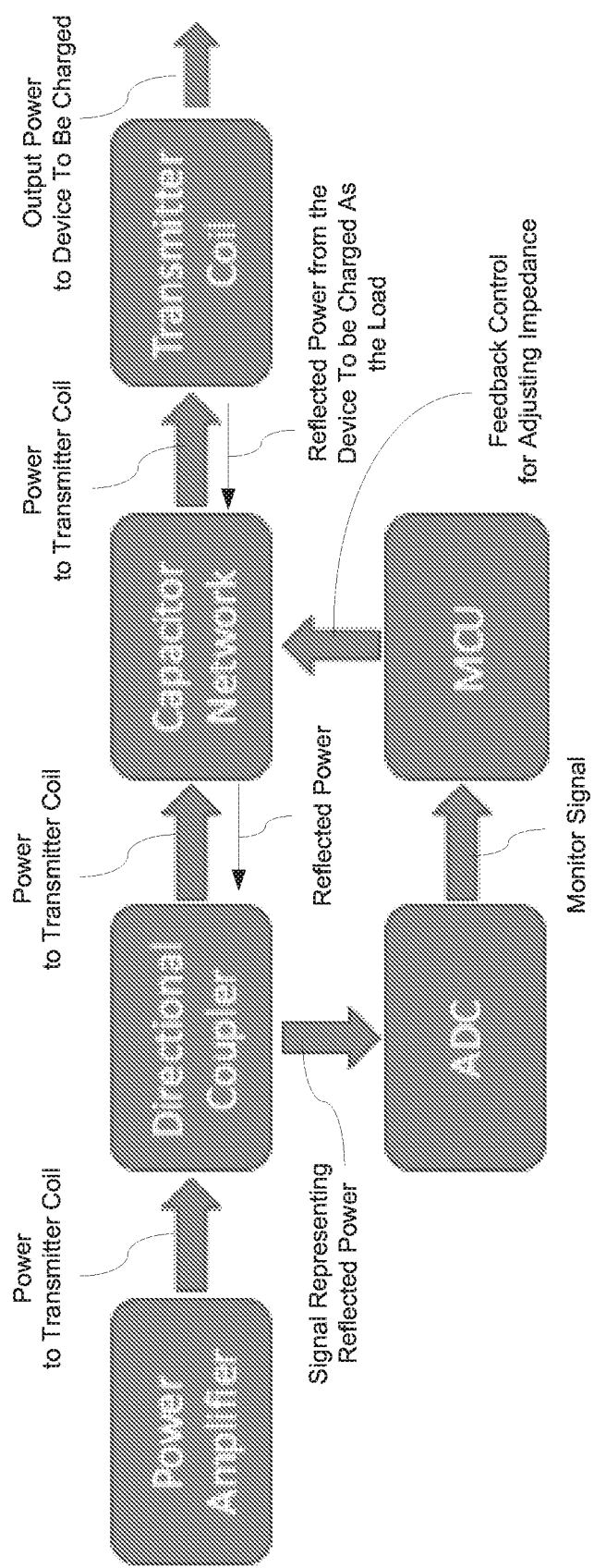
FIGS. 6, 7 and 8 illustrate examples of dynamically adjustable capacitor network coupled to a resonant inductive wireless power system of the disclosed technology.

FIG. 6 shows an example of a processor or microcontroller-based feedback control for operating a capacitor network to provide desired adjustable impedance matching in a wireless charging device based on a positon or orientation of a device to be changed. In this example, a power supply that powers the charging device may include a power amplifier is connected to a directional coupler or another passive wave reflection/current/voltage/power monitoring device, which provides an analog signal sample to an analog-to-digital converter (ADC) unit as part of the control feedback loop. A capacitor network is coupled between the directional coupler and the transmitter coil, which may be one of the multiple transmitter coils in a coil array as shown in examples in FIGS. 2A, 2B, 3, 4 and 10. The transmitter coil is electromagnetically coupled to a receiver coil of a device to be charged and a portion of the power that is directed from the transmitter coil to the device to be charged, which is the load of the LC network of the charging device, can be reflected back and a portion of this reflected signal can be represented by a signal from the capacitor network to the directional coupler and this signal is directed by the directional coupler to the ADC unit in the control feedback loop as shown in FIG. 6. The ADC unit receives and processes the analog signal sample from the directional coupler and generates a digital monitor signal carrying information on the power variation in the reflected signal from the transmitter coil that represents the impedance matching condition between the transmitter coil and the receiver coil of the device to be charged. This information is sent to a microcontroller unit (MCU) or a microprocessor, which chooses the values of the capacitors in the network based on an algorithm that adjusts for potential changes in the reflected power to the transmitter. The MCU produces a feedback control signal to the capacitor network to operates switches in the capacitor network to achieve a desired impedance based on the feedback control signal. This process may be carried on the fly or in real-time during the device charging operation. When taking costs into consideration, it is possible to use multiple independent subsystems that share the same ADC unit and MCU for this adjustment operation. For example, a shift register can be used so more pins are available on a MCU.

Figure 7:
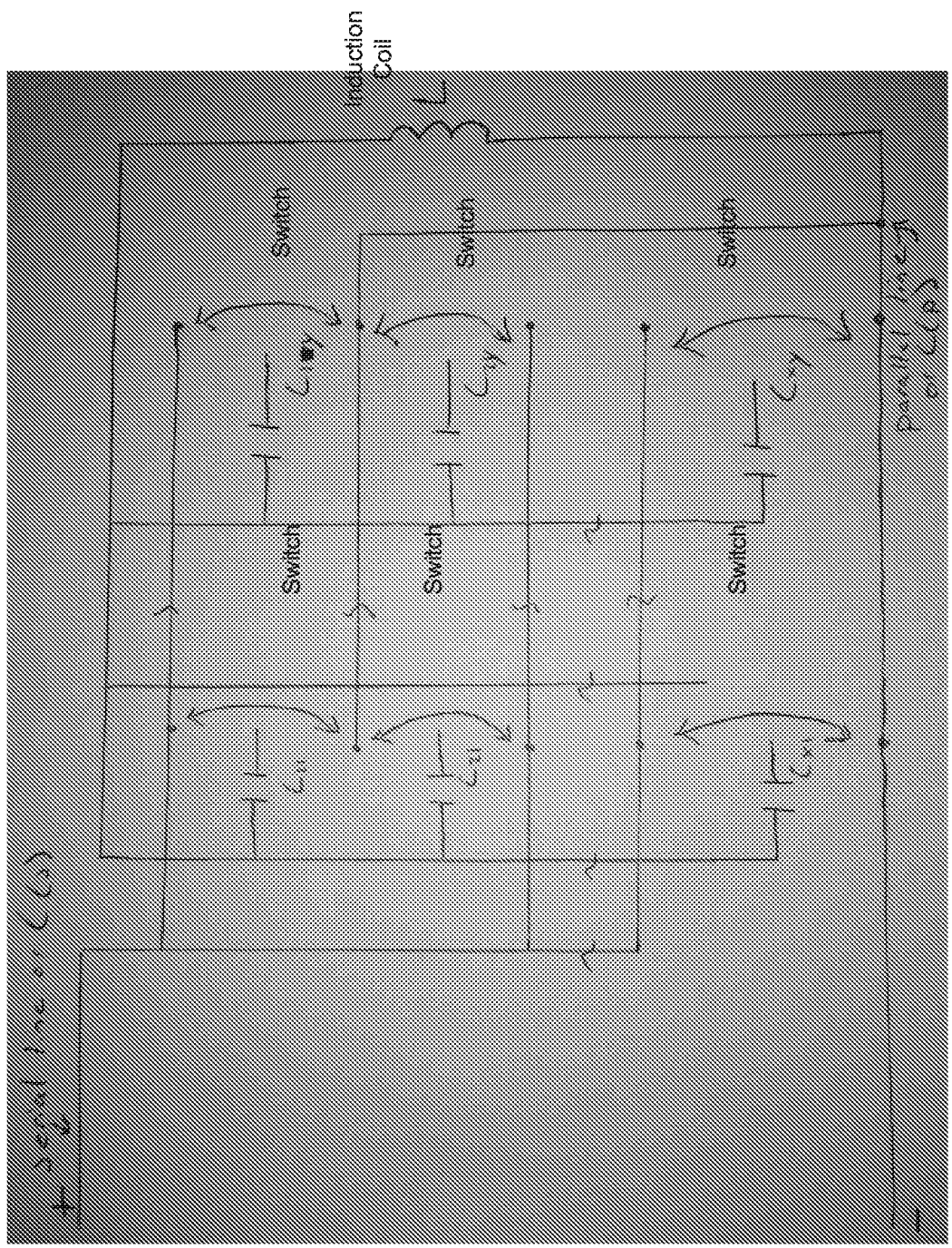

In the example in FIG. 6, the capacitance network is structured to provide altering parallel and serial resonant capacitance lines to transmitter coil(s) (L) via a microcontroller unit (MCU) in order to compensate for a reflected impedance change. FIG. 7 shows an example of a capacitance network having capacitors to $C_{11}$ to $C_{xy}$, where $C_{xy}$ is the last capacitor in the network and the bidirectional switches are represented by the double sided arched arrows that can place each capacitor on either the parallel or serial lines. Examples of such a bidirectional switch include electromechanical, mechanical, or purely electrical switches. The switches are operated to change the connections of the individual capacitors in the network to either the parallel or the serial line to alter the impedance matching condition of the transmitter device and optimize the charging operation. Since a bidirectional switch is used to place each capacitor in one of the two configurations, there are $2^N$ potential different combinations where n represents the number of capacitors in the network. For example, if there are seven capacitors in the network, then there are $2^7$ or 128 potential combinations or steps in capacitance values possible.

Figure 8:
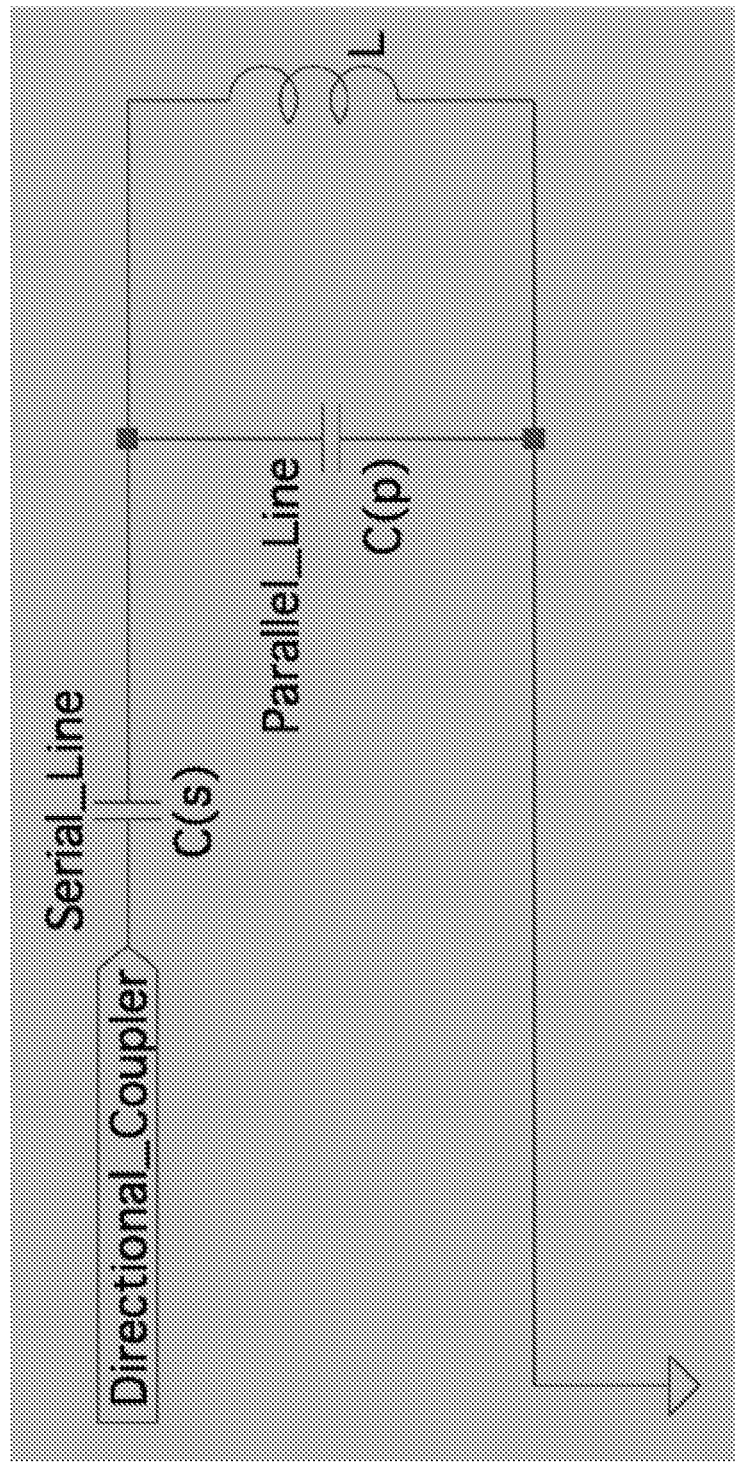

FIG. 8 shows the resulting C(s) and C(p) lines resonating with L in which C(s) or the serial line is in series with L and C(p) or the parallel line is in parallel with L. Because the total resonant capacitance exciting L does not change because C(s)+C(p) is constant and only the values of the parallel and serial lines change via the independent combinations of the capacitors in the network, the resonant frequency remains the same, while the impedance of the transmitter is altered.

The above disclosed capacitance network is capable of dynamically altering the transmitter's impedance while maintaining the same resonant frequency. Practical implementations may be designed based on additional considerations. For example, since the capacitors in the network will be resonating in the LC tank after an amplifier circuit, the voltage across the switches may undesirably spike (e.g., above 100 volts) and the current passing through the switch may also exceed a desired high current limit, e.g., several amps for low power charging systems. Furthermore, the parasitic capacitance of the switch should be low in order for the network to operate effectively and the parasitic resistance of the switch should also be low in order for the charging system to operate efficiently. Therefore, the selection of the switching device can be important for safe, efficient, and effective charge system design and operation.

A receiver device 120 or 520 depicted in FIG. 1 or FIG. 5A receives the electromagnetic field generated by the wireless charging (transmitter) device at one or more coils in the receiver device 120 or 520 and this reception can be maximized for energy transfer efficiency via adjusting the capacitance network when the positioning or angular distance of the receiver to the transmitter are at various different positioning or angular distances. Specifically, an implementation of the receiver can include an LC tank that receives the AC signal for carrying the energy to be transferred and can operate to convert the received AC signal into a DC signal by a conversion circuit, e.g., a conversion circuit using a bridge rectifier to perform the conversion and a smoothing bypass capacitor to further condition the converted DC signal. In between the LC tank and bridge rectifier, an LC or Pi matching network is placed to eliminate the imaginary resistance and reduce harmonic distortions. The DC signal is then regulated at a particular voltage, e.g., 5 volts, for mobile applications through a voltage regulator and applied to the electronic device. The voltage regulator and size of the receiver antenna can be altered based on the application.

In some implementations of the "open" or "closed" systems, for example, the number of receivers that operate simultaneously may be limited in order to preserve potentially limited battery capacity of the transmitter device 110. For example, in a portable wireless charging product with the "open" system transmitter that includes a battery or otherwise not connected to an AC source (e.g., such as a wall outlet), then the source is limited to the current capacity of the rechargeable battery built into the transmitter. Because of this, it may be more desirable to charge a single device or a limited number of devices quicker and more effectively rather than charging a large number of devices slowly by distributing the limited energy from the charging device to too many devices to be charged. Using a communication interface, e.g., such as Bluetooth Low Energy (BLE), a user can control what devices are to be charged and the time duration for charging such devices through a user interface. For example, when mobile devices are to be charged, the mobile user can use a mobile application on a mobile device to inform the charging device transmitter via Bluetooth what receiver devices should be charged and how to adjust the capacitor matrix to enhance or maximize the charging.

In some implementations, for example, an open circuit can be created through a mechanical or electrical switch (of the control circuit 518), such as NPN bipolar transistors, controlled by the processor 501 (e.g., a microcontroller), for those receivers in the vicinity of the transmitter that the user prefers not to charge so that the reflected impedance is not accidentally altered in a manner that influences a change in the impedance matching network.

For example, applications, such as automotive wireless charging systems, the manufacturers of electric vehicles may be more inclined to place a limit on the amount of power the wireless charging system can use in order to preserve battery capacity for other functions. For example, there may be an implicit limitation on how many and what kind of devices can operate simultaneously, making the option of creating open circuit for a limited number of receivers a necessity rather than a consumer preference. Also, for an "open" system, it may be possible that a matching network cannot be optimized that meets a minimum level of operational efficiency for multiple receivers. As stated previously, resonant inductive technology can struggle to charge multiple devices simultaneously if the transmitter coils are not significantly larger than the receiving coils. If a matching network cannot be optimized for effective energy transfer of multiple receivers in the charging radius of an "open" system due to their positioning to the transmitter, for example, then the ability to limit the number of receivers in the area of the transmitter may be essential for its operation.

An "open" system may increase the output power and charging radius of the transmitter when attached to a wall outlet or a source with greater power levels than the power of its built-in DC source. For example, in some implementations of the disclosed technology, an "open" system can be designed to be capable of wirelessly recharging via radio frequency (RF) harvesting and/or resonant inductive charging where the "open" wireless charging product acts as a receiver to another wireless charging platform, e.g., such as a custom designed inductive charging pad for the product or resonant inductive bicycle systems. In an example, a resonant inductive bicycle system can include a generator attached to a bicycle that converts the mechanical energy of the user riding the bike to electrical energy that may be further amplified before being delivered to resonating LC tanks that convert the electrical energy to electromagnetic waves. This is then sent to corresponding LC tanks in the "open" wireless charging product, e.g., such as a portable wireless charging system, to recharge its DC power source. Because the base of a user's backpack may be very close to the back seat of a bicycle, a resonant inductive bicycle product can be attached to the back wheel and recharge, for instance, a portable wireless charging platform in the user's backpack, which then recharges the user's devices as they move freely by leveraging its three-dimensional phased coil array. To summarize, an "open" system functions in a comparable manner to a router but instead of sending out data it sends out power, and can be designed to increase the radius of the router as well as charged by multiple modems that are designed for it.

In some implementations for an "open" system, the packaging design of the transmitter device (e.g., device 110 or 510) is an important consideration for implementation of portable resonant inductive charging processes, where the transmitter device includes the three-dimensional coil array, a DC power source, and printed circuit board(s) (PCBs). For example, because the diameter of coils are highly correlated with the charging distances achieved for a resonant inductive system, the coils of a portable wireless charging platform can be configured to be large enough for the electromagnetic fields to reach a receiver for meaningful distances between the transmitter and receiver. Furthermore, in order to achieve angular flexibility for the receiver, the transmitter coils can be positioned in a three-dimensional architecture, according to the disclosed technology. However, the arrangement of transmitter components (e.g., power source and/or converter, control circuit including PCB, etc.) within the overall transmitter device, as well as the form factor of the transmitter device, can affect the efficacy and efficiency of the resonant inductive coupling by the receiver device. The exemplary three-dimensional coil array configurations of the present technology allows for the placement of the remaining transmitter components (e.g., power source and/or converter, control circuit including PCB, etc.) in configurations inside or partially inside the three-dimensional coil array to achieve portability of the transmitter device.

For example, if a high power density rechargeable battery is placed adjacent to the coil array, then the transmitter device product may become significantly larger in size as well as potentially different and/or stricter in shape. For a portable wireless charging system, minimizing the dimensions of the product is an important consideration for its desired applications. For instance, if the transmitter is too large to be placed in a briefcase, book bag, pocketbook, or other place of storage and use in portable applications, then the intended applications and usage of the wireless charging product may become diminished.

Figure 9:
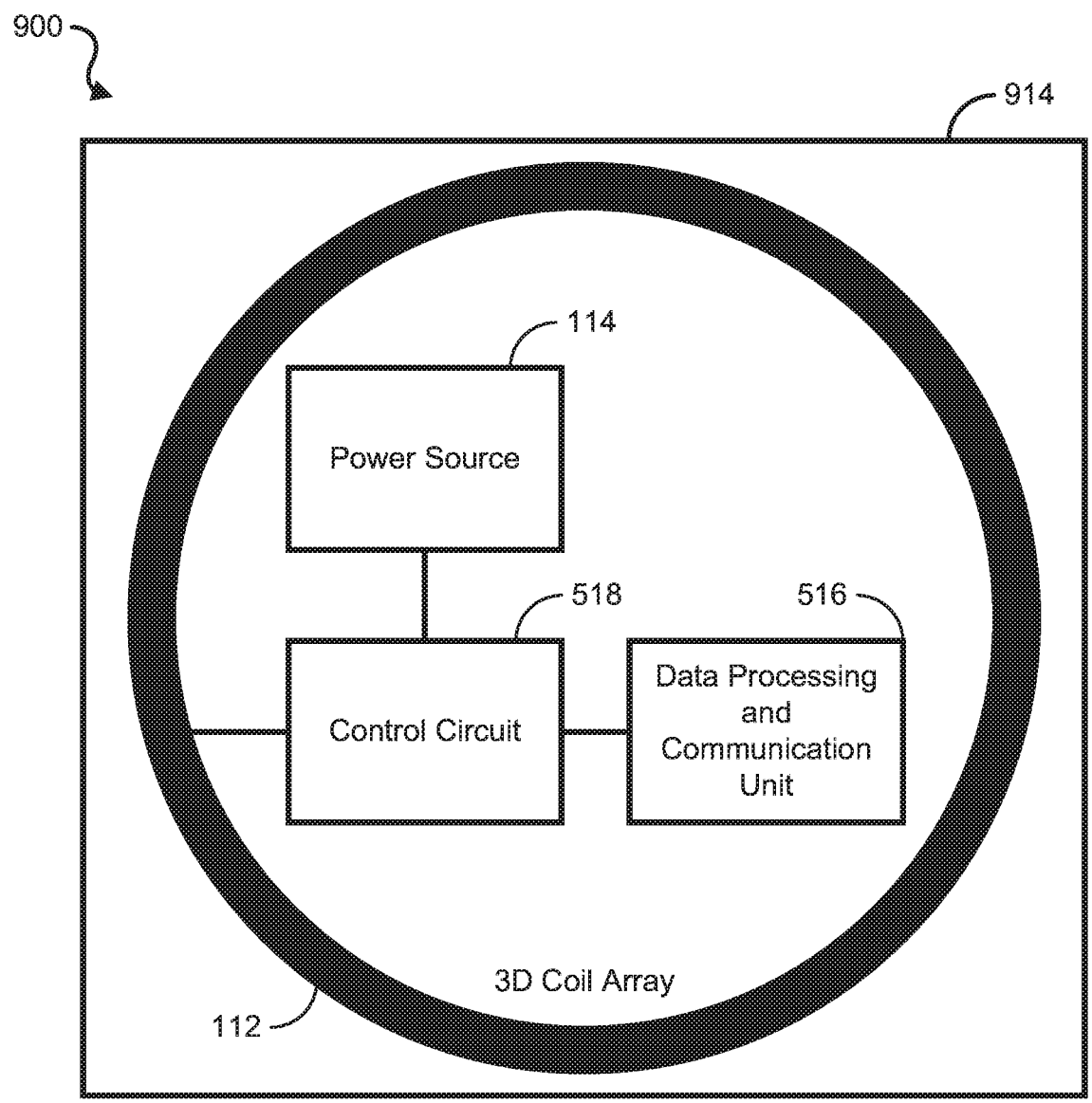
FIG. 9 shows a block diagram of an example of a portable wireless charging transmitter device of the disclosed technology.

FIG. 9 shows a block diagram of an example of a portable wireless charging transmitter device 900 of the disclosed technology. The transmitter device 900 includes a housing 914 that contains the three-dimensional phased transmitter coil array 112, which encompasses or at least partially encompasses the power source 114, the data processing and communication unit 516, and the control circuit 518. In this example embodiment, the transmitter components are placed inside the coil architecture to minimize the product dimensions so that the three-dimensional coil array to be the key determinant in the product's size. Meanwhile, for a "closed" system, it may be advantageous that the coil array and PCBs are to be manufactured directly into the interior of the transmitter device. With respect to the packaging design of the transmitter device for a "closed" system, it is not essential for the transmitter components to be arranged within the coil array in the interior of the transmitter device.

Some features of the disclosed technology may include one or more of the following, as an example. The system 100 may have separate driving and resonating coils for each coil in the array 112. The receiver device 120 may include a singular resonating coil or an array of coils, e.g., such as the coil array 112. The receiver device 120 may include two or three-dimensional coil structures to further increase angular flexibility depending on the application, e.g., such as three-dimensional loop coils or perpendicularly placed dipole coils. The transmitter device 110 may have a coil array with different resonating frequencies for the individual coils, and the receiver device 120 may have a coil array with corresponding resonant frequencies.

For an "open" system, for example, the transmitter device 110 can have a single rectangular, elliptical, circular, or surface spiral air or ferrite coil with actuators and/or other motors that move the single coil on a three dimensional plane as a substitute to the three-dimensional coil array.

In some implementations, the transmitter device 110 may have separate systems that control the supply for the coil array 112 and the alterations in the impedance matching networks, e.g., such as various wireless communication interfaces, such as Bluetooth Low Energy, informing the transmitter of changes in the positioning of the receiver by accessing a gyroscope and accelerometer, and changing the impedance matching network for these coils through a power sniffer, such as a directional coupler.

In some embodiments of the present technology, the configuration of the coils in the three dimensional phased coil array can be arranged at acute angles with respect to each other. In some embodiments, for example, some coils may be perpendicular to one another while others have acute angular alignments.

Figure 10:
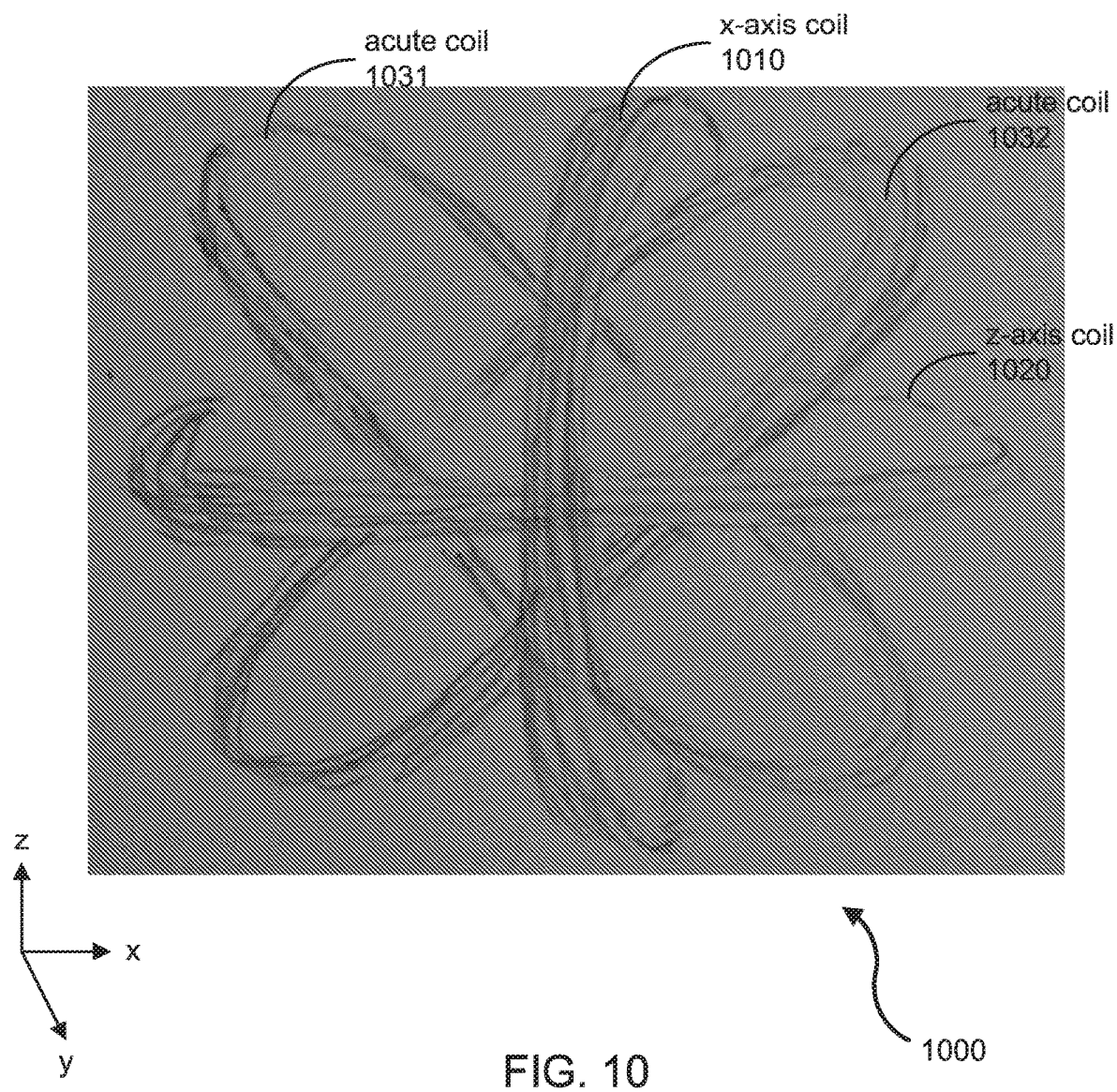
FIG. 10 shows a diagram of another example transmitter coil array of the present technology.

FIG. 10 shows an example of a three dimensional phased coil array 1000 of the present technology including four circular air core coils aligned about each other at acute and perpendicular angles and intersecting one another. The coil array 1000 includes a first coil 1010 shown in the diagram to be arranged on the y-z plane (referred to as the x-axis coil), and a second coil 1020 shown to be arranged on the x-y plane (referred to as the z-axis coil). The first and second coils 1010 and 1020 are arranged to be perpendicular to each other. The coil array 1000 includes a third coil 1030, referred to as the acute coil 1031 in the diagram, arranged at an acute angle with respect to the x-axis coil 1010 and the z-axis coil 1020. The coil array 1000 includes a fourth coil, an acute coil 1032, arranged with respect to the x-axis coil 1010 and the z-axis coil 1020. The acute coil 1031 and the acute coil 1032 may be arranged to have an acute angular alignment or a perpendicular alignment with respect to each other. The coil array 1000 may include additional coils to affect the direction of the transmitted electromagnetic field to the receiver coil for resonant inductive coupling to wirelessly charge the receiving device from the transmitter device. In some implementations, for example, the coil array 1000 may be implemented in an "open" system transmitter device.

Exemplary Applications of the Disclosed Technology

The global battery charger market is estimated to be approximately twelve billion dollars, and is mainly driven by the wireless charging segment. This sector encompasses all solutions that intend to wirelessly recharge electronics, such as smartphones and tablets, and is currently approximately two billion dollars, with an expectation to grow to about seven billion dollars in the coming years.

Currently, the market is well divided because many disagree on what circuits maintain the most efficient and convenient charge. The two predominant standards are currently referred to as 'Qi' and 'AirFuel' (formerly known as A4WP), and have the market split in a manner that is reminiscent of the VHS and Betamax wars of the past. The main issue is that each standard uses different frequencies and integrated circuits (ICs), which cause incompatibility when one standard's receiver is used with another standard's product. Although some believe that the two standards will eventually merge, if one standard beats out another, there will be many companies that will struggle to adopt the other standard due to many products being highly tuned to a standard's frequency. Thus, even choosing a standard, if any, before building a new wireless charging product is a struggle in itself, and has kept the market sharply divided with many consumer electronics manufacturers reluctant to commit to a specific standard.

Existing inductive charging pad devices are typically thin pad-like objects that charge smartphones, and sometimes tablets, by simply having an electronic device on the pad. Inductive charging pad device are envisioned to be popular products that could be ubiquitously found in places like restaurants to airports. Notably, however, these existing devices cannot effectively or efficiently charge multiple devices, suffer from overheating issues, not independent (e.g., almost all rely completely on an outlet, and are therefore not portable), provide inflexible positioning of the electronic device to be charged, and fail to provide wireless user control or customization.

The disclosed technology provides wireless power transmission for charging electronic devices, e.g., such as smartphones, and robotics, such as microbotics, that can wirelessly charge one or more receiver devices by a transmitter device of the disclosed technology including a three-dimensional phased coil array. The disclosed transmitter devices are able to wirelessly charge the receiving device or devices in a manner that is able to overcome severe angular misalignment between the transmitter and receiver devices, and charge multiple receiver devices simultaneously whether in a stationary position or while moving in three-dimensional space.

EXAMPLES

The following examples are illustrative of several embodiments of the present technology. Other exemplary embodiments of the present technology may be presented prior to the following listed examples, or after the following listed examples.

In an example of the present technology (example 1), a wireless power system includes a wireless charging transmitter device including a power source electrically coupled to a three-dimensional coil array structured to include two or more coils to produce an electromagnetic field that emanates from the three-dimensional coil array, in which the coils are arranged such that at least two coils are perpendicular to each other to direct the electromagnetic field to a charging area in which an electronic device can be wirelessly charged by including a receiver coil to receive the electromagnetic field from the three-dimensional coil array to charge or power the electronic device.

Example 2 includes the system of example 1, in which the coils of the three-dimensional coil array are structured to include rectangular, elliptical, circular, or surface spiral air or ferrite core coils.

Example 3 includes the system of example 1, in which the three-dimensional coil array is operable to direct the electromagnetic field into or out of a coil of the coil array based on a magnetic field produced depending on the flow of electrons through the coil.

Example 4 includes the system of example 1, in which the three-dimensional coil array is structured to include three circular coils arranged to be 90 degrees out-of-phase to one another on the x-axis plane, y-axis plane, and z-axis plane, respectively.

Example 5 includes the system of example 1, in which the three-dimensional coil array is structured to include five elliptical air core coils, including a first coil arranged at a top region of the coil array on the y-axis plane, a second coil arranged at a bottom region of the array on the y-axis plane and parallel with the first coil, a third coil arranged at a first side region of the array on the x-axis plane, a fourth coil arranged at a second side region of the array on the x-axis plane and in parallel with the third coil, in which the first and second coils are perpendicular to the third and fourth coils, and a fifth coil arranged such that it extends horizontally across the coil array and is perpendicular to the first, second, third, and fourth coils.

Example 6 includes the system of example 1, in which the three-dimensional coil array is structured to include six rectangular air core coils, including a first coil arranged at a top region of the array on the z-axis, a second coil is arranged at a bottom region of the on about the z-axis plane and in parallel with the first coil, a third coil arranged at a first side region of the array on the y-axis, a fourth coil arranged at a second side region of the array on the y-axis plane and in parallel with the third coil, a fifth coil at a third side region that is arranged horizontally at a first intersection of a portion of the first, second, third, and fourth coils and on the x-axis plane, and a sixth coil at a fourth side region on the x-axis plane that is arranged horizontally at a second intersection of another portion of the first, second, third, and fourth coils on the opposing side of the array with respect to the third side.

Example 7 includes the system of example 1, in which the transmitter device is operable to cause electromagnetic induction at the receiver coil during a positioning shift by the transmitter device or the receiver device by sending the electromagnetic field from multiple angles of the coils of the three-dimensional coil array.

Example 8 includes the system of example 1, in which the transmitter device is operable to cause electromagnetic induction at the receiver coil while allowing the receiver device to undergo free 360-degree movement by having one or more of the coils strengthen intensity and direction of magnetic fields.

Example 9 includes the system of example 1, in which the power source is an AC power source.

Example 10 includes the system of example 1, in which the power source is a DC power source, and the wireless charging transmitter device further includes a DC/AC converter to convert DC electrical energy to AC electrical energy that is provided to the three-dimensional coil array.

In an example of the present technology (example 11), a wireless charging transmitter device includes a power source; a three-dimensional coil array electrically coupled to the power source and structured to include two or more coils to produce an electromagnetic field that emanates from the three-dimensional coil array, in which the coils are arranged such that at least two coils are perpendicular to each other to direct the electromagnetic field, in which the wireless charging transmitter device is operable to wirelessly charge an electronic device by providing the electromagnetic field at a receiver coil of the electronic device to convert the electromagnetic energy to electrical energy to power the electronic device.

Example 12 includes the device of example 11, in which the coils of the three-dimensional coil array are structured to include rectangular, elliptical, circular, or surface spiral air or ferrite core coils.

Example 13 includes the device of example 11, in which the three-dimensional coil array is operable to direct the electromagnetic field into or out of a coil of the coil array based on a magnetic field produced depending on the flow of electrons through the coil.

Example 14 includes the device of example 11, in which the three-dimensional coil array is structured to include three circular coils arranged to be 90 degrees out-of-phase to one another on the x-axis plane, y-axis plane, and z-axis plane, respectively.

Example 15 includes the device of example 11, in which the three-dimensional coil array is structured to include five elliptical air core coils, including a first coil arranged at a top region of the coil array on the y-axis plane, a second coil arranged at a bottom region of the array on the y-axis plane and parallel with the first coil, a third coil arranged at a first side region of the array on the x-axis plane, a fourth coil arranged at a second side region of the array on the x-axis plane and in parallel with the third coil, in which the first and second coils are perpendicular to the third and fourth coils, and a fifth coil arranged such that it extends horizontally across the coil array and is perpendicular to the first, second, third, and fourth coils.

Example 16 includes the device of example 11, in which the three-dimensional coil array is structured to include six rectangular air core coils, including a first coil arranged at a top region of the array on the z-axis, a second coil is arranged at a bottom region of the on about the z-axis plane and in parallel with the first coil, a third coil arranged at a first side region of the array on the y-axis, a fourth coil arranged at a second side region of the array on the y-axis plane and in parallel with the third coil, a fifth coil at a third side region that is arranged horizontally at a first intersection of a portion of the first, second, third, and fourth coils and on the x-axis plane, and a sixth coil at a fourth side region on the x-axis plane that is arranged horizontally at a second intersection of another portion of the first, second, third, and fourth coils on the opposing side of the array with respect to the third side.

Example 17 includes the device of example 11, further comprising a circuit to control electrical power supplied from the power supply to the three-dimensional coil array.

Example 18 includes the device of example 17, wherein the control circuit is operable to control operational frequency or provide a matching network of the device as the electrical power is supplied to the three-dimensional coil array.

Example 19 includes the device of example 17, wherein the power supply and the circuit are placed within or at least partially within the three-dimensional coil array of the device.

In an example of the present technology (example 20), a wireless power system includes a wireless charging transmitter device including a power source electrically coupled to a three-dimensional coil array structured to include two or more coils to produce an electromagnetic field that emanates from the three-dimensional coil array, wherein the coils are arranged such that at least two coils are acute or perpendicular to each other to direct the electromagnetic field to a charging area in which an electronic device can be wirelessly charged by including a receiver coil to receive the electromagnetic field from the three-dimensional coil array to charge or power the electronic device.

Example 21 includes the system of example 20, wherein the coils of the three-dimensional coil array are structured to include rectangular, elliptical, circular, or surface spiral air or ferrite core coils.

Example 22 includes the system of example 20, wherein the three-dimensional coil array is operable to direct the electromagnetic field into or out of a coil of the coil array based on a magnetic field produced depending on the flow of electrons through the coil.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the embodiments and implementations described in the specification, together with the drawings, be considered exemplary, where exemplary means an example. As used herein, the singular forms "a", "an" and "the" are intended to include the plural forms as well, unless the context clearly indicates otherwise. Additionally, the use of "or" may include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

What is claimed are techniques and structures as described and show, including:

1. A wireless charging transmitter device, comprising:
a power source electrically coupled to a three-dimensional coil array,
wherein the three-dimensional coil array comprises two or more coils configured to generate an electromagnetic field,
wherein each one of the two or more coils is structured as a surface spiral coil comprising a continuous conductor with no breaks or radio frequency discontinuities wound around a dielectric material at an angle to diminish a proximity effect at an operating frequency of the wireless charging transmitter device, and to maintain a high intrinsic quality factor (Q) of the surface spiral coil at the operating frequency,
wherein the continuous conductor has a thickness that is approximately equal to 40 um,
wherein the two or more coils structured as surface spiral coils comprise a first surface spiral coil arranged on a y-axis plane, a second surface spiral coil arranged on an x-axis plane perpendicular to the first surface spiral coil, and a third surface spiral coil arranged on a z-axis plane of the coil array perpendicular to the first and second surface spiral coils; and,
a control circuit coupled to the power source to control electrical power supplied from the power source to the three-dimensional coil array,
wherein the power source and the control circuit are disposed within the three-dimensional coil array, and
wherein the control circuit controls electrical power supplied from the power source to the three-dimensional coil array by controlling a frequency of a signal coupled to an amplifier of the transmitter device.

2. The wireless charging transmitter device of claim 1, wherein the wireless charging transmitter device is operable to cause electromagnetic induction at a receiver coil of a receiver device while allowing the receiver device to undergo free 360-degree movement by having one or more of the surface spiral coils strengthen intensity and direction of the generated electromagnetic fields.

3. The wireless charging transmitter device of claim 1, wherein the power source is a DC power source, and the transmitter device further includes a DC/AC converter to convert DC electrical energy to AC electrical energy that is provided to the coil array.

4. The wireless charging transmitter device of claim 1, further comprising an adjustable capacitance network circuit coupled between the power source and the coil array, wherein the adjustable capacitance network circuit includes capacitors controllable by switches to adjust an impedance of the transmitter device without adjusting a resonant frequency of the transmitter device.

5. The wireless charging transmitter device of claim 4, further comprising a control circuit coupled to the adjustable capacitance network circuit to control the switches in response to a change in a reflected signal from a surface spiral coil in the coil array.

6. A wireless power system, comprising:
a transmitter device comprising an antenna array comprising a plurality of surface spiral coils,
wherein the antenna array comprises a first surface spiral coil arranged on a y-axis plane, a second surface spiral coil arranged on an x-axis plane perpendicular to the first surface spiral coil, and a third surface spiral coil arranged on a z-axis plane of the antenna array perpendicular to the first and second surface spiral coils,
wherein the transmitter device is inductively coupled to and in resonance with a receiver device, and
wherein each one of the plurality of surface spiral coils comprises a continuous conductor with a thickness of approximately 40 um that is wound around a dielectric at an angle to diminish a proximity effect at radio frequencies and increase a quality factor (Q) of each one of the surface spiral coils of the antenna array;
an adjustable impedance matching network coupled to the antenna array to dynamically adjust an impedance of the transmitter device in response to a change in a reflected impendence or a change in power transmission of at least one surface spiral coil in the antenna array,
wherein the change in the reflected impedance or the change in power transmission is based on at least one of a presence of a device close to the transmitter device an orientation of the receiver device, and a change in position of the receiver device, and
wherein dynamically adjusting the impedance of the transmitter device increases energy transfer from the transmitter device to the receiver device; and, a first control circuit coupled to a power source to control electrical power supplied from the power source to the antenna array,
wherein the power source and the first control circuit are disposed within the antenna array, and wherein the first control circuit controls electrical power supplied from the power source to the antenna array by controlling a frequency of a signal coupled to an amplifier of the transmitter device.

7. The wireless power system of claim 6, wherein dynamically adjusting the impedance of the transmitter device further comprises controlling one or more switches in the adjustable capacitor network to configure a plurality of capacitors in the adjustable capacitor network to dynamically adjust the impedance of the transmitter device without changing the resonant frequency of the transmitter device.

8. The wireless power system of claim 6, further comprising:
a monitoring circuit to monitor a change in power transmission of at least one surface spiral coil in the antenna array; and
a second control circuit coupled to the monitoring circuit configured to dynamically adjust, without shifting a resonant frequency of the transmitter device, the impedance of the adjustable impedance matching network in response to the change in power transmission.

9. The wireless charging transmitter device of claim 1, wherein the two or more coils structured as surface spiral coils are arranged such that at least two surface spiral coils form an acute angle to each other.

10. A method for transmitting wireless power from a transmitter device to a receiver device, the method comprising: supplying electrical power from a power source to a three-dimensional coil array, wherein the three-dimensional coil array comprises two or more surface spiral coils configured to generate an electromagnetic field, wherein the three-dimensional coil array comprises a first surface spiral coil arranged on a y-axis plane, a second surface spiral coil arranged on an x-axis plane perpendicular to the first surface spiral coil, and a third surface spiral coil arranged on a z-axis plane of the three-dimensional coil array perpendicular to the first and second surface spiral coils, wherein each one of the two or more surface spiral coils comprise a continuous conductor with a thickness of approximately 40 um and with no breaks or radio frequency discontinuities wound around a dielectric material at an angle to diminish a proximity effect at an operating frequency of the wireless charging transmitter device, and to maintain a high intrinsic quality factor (Q) of the surface spiral coil at the operating frequency, and wherein the power source, and a control circuit coupled to the power source to control the electrical power supplied from the power source to the three-dimensional coil array, are disposed within the three-dimensional coil array, and the control circuit controls the electrical power supplied from the power source to the three-dimensional coil array by controlling a frequency of a signal coupled to an amplifier of the transmitter device;

directing the generated electromagnetic field to a charging area to charge or power one or more receiver devices; and, dynamically adjusting an impedance of the transmitter device in response to a change in a reflected impendence or a change in power transmission of at least one of the surface spiral coils, wherein the change in the reflected impedance or the change in power transmission is based on at least one of a presence of a device close to the transmitter device, an orientation of the receiver device, and a change in position of the receiver device, and wherein dynamically adjusting the impedance of the transmitter device does not shift a resonant frequency of the transmitter device.

11. The wireless charging transmitter device of claim 1, wherein the operating frequency comprises radio frequencies in the high frequency (HF) band.

12. The wireless charging transmitter device of claim 1, wherein the conductor is wound around the dielectric material at an angle approximately equal to 120 degrees.

13. The wireless charging transmitter device of claim 1, wherein the conductor is wound around the dielectric material at an angle to maintain the intrinsic quality factor (Q) of the surface spiral coil at approximately 700.

14. The wireless charging transmitter device of claim 1, wherein the surface spiral coil has a diameter of approximately 6 inches.

* * * * *

UNITED STATES PATENT AND TRADEMARK OFFICE
CERTIFICATE OF CORRECTION

PATENT NO. : 10,644,542 B2  
APPLICATION NO. : 15/759473  
DATED : May 5, 2020  
INVENTOR(S) : Joshua Aaron Yankowitz Page 1 of 1

It is certified that error appears in the above-identified patent and that said Letters Patent is hereby corrected as shown below:

On the Title Page

In the Abstract (57), Lines 4-5, please delete the second instance of "Power Source"

In the Claims

Column 20, Line 25, Claim 6 please insert a --,-- after "transmitter device"

Column 20, Line 66, Claim 10 please move "wherein the" to a separate paragraph

Signed and Sealed this  
Sixteenth Day of June, 2020

Andrei Iancu  
*Director of the United States Patent and Trademark Office*